H. MUELLER.
HANDLE FOR FAUCETS.
APPLICATION FILED FEB. 10, 1909.

963,166.

Patented July 5, 1910.

2 SHEETS—SHEET 1.

Witnesses.
Chester W. Hathaway.
Virginia Hamilton

Inventor:
Henry Mueller
by John L. Waddell
Attorney.

THE NORRIS PETERS CO., WASHINGTON, D. C.

H. MUELLER.
HANDLE FOR FAUCETS.
APPLICATION FILED FEB. 10, 1909.

963,166.

Patented July 5, 1910.
2 SHEETS—SHEET 2.

Witnesses
Chester W. Hathaway
Virginia Hamilton

Inventor
Henry Mueller
by John L. Waddell
Attorney

THE NORRIS PETERS CO., WASHINGTON, D. C.

UNITED STATES PATENT OFFICE.

HENRY MUELLER, OF DECATUR, ILLINOIS, ASSIGNOR TO THE H. MUELLER MANUFACTURING COMPANY, OF DECATUR, ILLINOIS, A CORPORATION OF ILLINOIS.

HANDLE FOR FAUCETS.

963,166.  Specification of Letters Patent.  Patented July 5, 1910.

Application filed February 10, 1909. Serial No. 477,208.

*To all whom it may concern:*

Be it known that I, HENRY MUELLER, a citizen of the United States, and resident of Decatur, Macon county, State of Illinois, have invented certain new and useful Improvements in Handles for Faucets; and my preferred manner of carrying out the invention is set forth in the following full, clear, and exact description, terminating with claims particularly specifying the novelty.

The present invention relates to faucets or bibs for water distribution and particularly to self-closing faucets, and especially the present improvement has to do with the handle structure, and its connection with the valve stem, the gland, and the valve operating parts.

The object of the invention is to provide a handle for faucets of this type which will afford a ready and convenient hand-hold which will permit a close assemblage of the parts, and one in which the parts may be conveniently and securely fastened together so that the work of setting up, adjusting, or dismantling the fitting may be easily performed.

Figure 1:
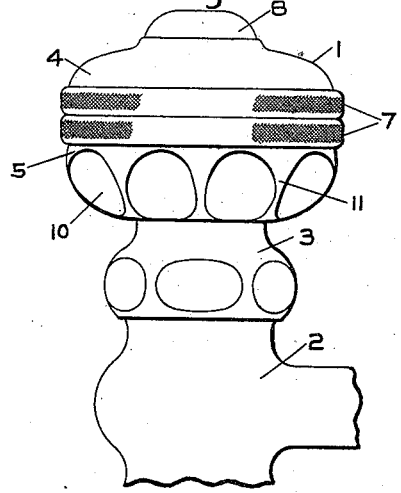
Figure 2:
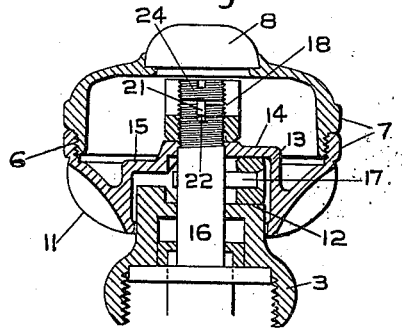
Figure 3:
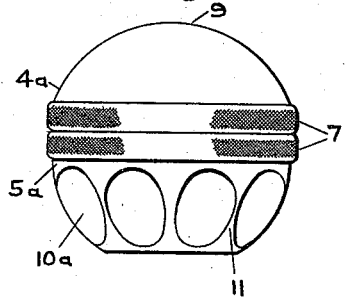
Figure 4:
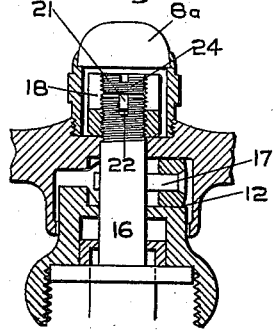
Figure 5:
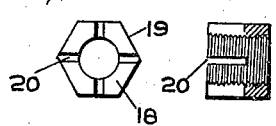
Figure 6:
Figure 7:
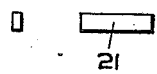
Figure 8:
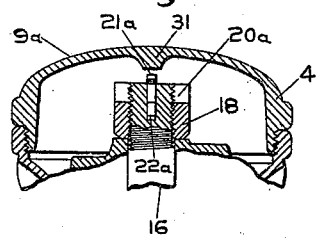
Figure 9:
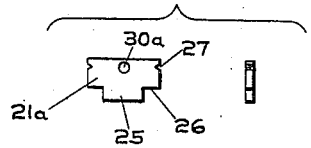
Figure 10:
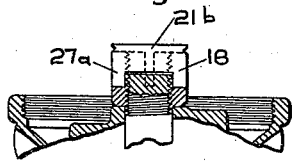
Figure 11:
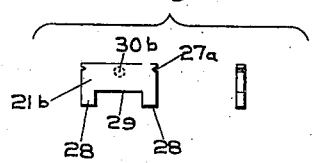
Figure 12:
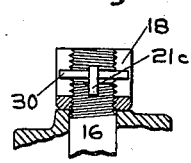
Figure 13:
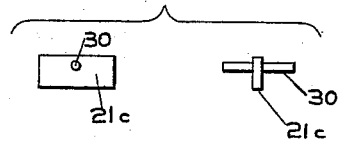

In the drawings herewith I have illustrated several embodiments of my invention, and in said drawings Figure 1 is a side view of a faucet provided with my improved handle. Fig. 2 is a sectional view to show the interior construction and relation of the parts. Fig. 3 is a side view of a handle removed from the faucet, the design of this handle varying slightly from that shown in Fig. 1. Fig. 4 is a detail sectional view of a gland, a valve stem, and a handle secured thereto. Figs. 5, 6 and 7 are detail views of the valve stem nut, locking key and key retaining elements. Fig. 8 is a detail view of a slightly different form of valve stem nut and locking key. Fig. 9 is a detail view of the locking key shown in Fig. 8. Fig. 10 is a detail view of still another form of locking key for the valve stem nut. Fig. 11 is a detail view of the key shown in Fig. 10. Fig. 12 is a detail view of still another form of valve stem nut and key. Fig. 13 is a detail view of the key shown in Fig. 12.

Referring to the drawings by numbers, like numbers indicating like parts in the several views, 2 indicates a portion of the faucet body which may be of any suitable construction.

3 denotes the gland nut which is secured to the top of the faucet body 2 in the usual manner.

Rotatively mounted upon said gland nut is the handle 1 of the faucet which, in the form shown, is of flattened spherical form, said handle being preferably composed of two parts 4 and 5, which may be joined in any suitable manner, as by the screw thread connection 6 (see Fig. 2). The said handle is provided at its point of greatest circumference with the extended or outstanding rib or ribs 7, which are preferably knurled or roughened to provide a good gripping surface for the hand. The upper section 4 of the handle may, if desired, be provided with the inserted index 8 in the customary manner. The lower section 5 of the said handle has finger recesses 10 preferably separated from each other by the partitions 11, and it will be observed that the outstanding ribs 7 extend beyond the greatest diameter of the handle proper so as to insure the hand of the operator in engaging the knurled gripping surfaces, thus insuring contact of the operator's hand with a proper gripping surface when the handle is grasped, and not leaving the operator dependent entirely on the finger grips or recesses for manipulating the handle. It has been found in practice that this extended knurled rib gives a handle which can be manipulated very easily and with certainty, and all danger of slipping of the hand is avoided.

In the form of handle shown in Fig. 3 a plain dome-like top 9 is provided, and the sections 4$^a$ and 5$^a$ are somewhat elongated so that the handle more nearly approaches a sphere than the flattened form shown in the other views, and in this construction found in Fig. 3 I preferably elongate the finger recesses 10$^a$ to conform to the spherical shape of the handle.

It will be observed that the gland 3 is provided on its upper surface with a cam face 12, and this cam faced upper end of the gland 3 is seated in a recess in the bottom of the handle 1, the end wall of this recess being provided with a cam surface which is opposed to the cam surface 12 on the top of the gland 3, the cam surface at the end wall of the recess being preferably formed by offsetting the wall of the recess so that the portions 14 and 15 lie in different planes, which portions 14 and 15 are connected by an inclined surface so as to give a cam track.

The stem 16 of the valve rises from the gland 3, extends through a perforation in the handle into the interior thereof, and mounted upon the stem 16 is a roller bearing pin 17 supporting a roller which lies between the cam surfaces on the gland 3 and in the recess of the handle 1, so that as the handle 1 is rotated it will operate the valve through the stem 16, the cam roller riding up the inclined surfaces in opening the valve and automatically riding back under the influence of the usual valve spring to effect closing of the faucet.

In order to lock the stem 16 and handle 1 together, I provide a kerfed nut 18 preferably having the flat engaging surfaces 19 and a plurality of diametrical kerfs 20 across its upper face. The nut 18 is engaged with the threaded end of the stem 16, the upper end of which stem is also kerfed or slotted, and when the nut 18 is brought into such position that any kerf 20 therein registers with the kerf in the stem 16, a transverse locking key 21 is dropped into these registering kerfs which lock the nut and stem against relative rotation. Various devices may be adapted for securing the cross key in place, the form shown in Figs. 2, 4, 6 and 7 embodying a screw plug 24 which is screwed into the upper end of the nut 18 and down against the key 21 to hold it against transverse displacement being a very satisfactory one.

It will be seen that the construction of handle 1 readily lends itself to convenient assembling of the parts for the lower section 5 of the handle being fitted in place on the valve stem 16, its fastening nut and locking key may be secured in place, and the upper section 4 of the handle then put in position.

In Figs. 8 and 9 I have shown a slightly different form of nut locking key in which the key 21$^a$ is provided with a projection 25 which drops into a seat 22$^a$ formed in the upper end of the valve stem, the wings 26 of the locking key engaging the kerf 20$^a$ in the nut 18 so that when the key 21$^a$ is in place it locks the parts against relative rotation, and the projection 25, dropping into the seat 22$^a$, prevents longitudinal movement of the key. Preferably the key 21$^a$ will be notched as at 27 so as to give a convenient means for grasping and lifting the key from its seat.

In the form of locking key shown in Figs. 10 and 11 I provide the key 21$^b$ with two end projections 28, between which is the valve stem slot engaging surface 29, and from inspection of Fig. 10 it will be seen that the lugs 28 drop down on either side of the stem and effectually prevent longitudinal movement of the key. The key is provided with the lifting notches 27$^a$ so as to permit its ready displacement from its locking position.

In the form of locking key shown in Figs. 8, 9, 10 and 11, where the part 4 of the handle is plain as shown in Fig. 8, I provide interiorly of the said part 4 a downwardly projecting lug or portion 31, the lower surface of which, when said part 4 is in fixed position with relation to the assembled handle, is in such proximity to the locking key 21$^a$ or 21$^b$, as to prevent its dislodgment from the recess 22$^a$. The lower surface of the lug 31 may bear against the key 21$^a$ or 21$^b$, its entire length centrally or to any extent to prevent dislodgment; the depth or length of said lug 31 depends entirely upon the style of locking key used and curvature of the part 4, as I may provide a key with a straight surface as shown in 21$^c$ in Fig. 13, but otherwise designed as 21$^a$ or 21$^b$, thus dispensing with the outwardly grooved notches 27 and 27$^a$ and inserting in the key a perforation or hole 30$^a$ as seen in Fig. 9 and in dotted lines 30$^b$ Fig. 11, said perforation allowing for the ready dislodgment of said key by lifting or tilting it from its position when adjusting, replacing or removing the lower portion of the handle.

In the form of locking key shown in Figs. 12 and 13 the upper end of the stem 16 is kerfed so as to receive the key 21$^c$ which has a transverse pin 30 inserted through the hole 30$^a$ adapted to engage a kerf in the nut 18 at a right angle to the line of the key 21$^c$, thus effectively locking the parts together.

In providing the double knurl 7 on one edge of the contacting surfaces of the parts 4 and 5 of the handle, I provide an ample wrench hold for use in assembling the knurled portion thereof, allowing the wrench to grip further, thus preventing the marring of the finished portions of the article to which the handle is applied, as it is a well-known fact that the gripping of a large surface for the tightening or loosening of any screw threaded portions is much more easy and performed with less danger of marring the surface than that of gripping small surfaces, as has been the custom in this article.

Having disclosed my invention, I claim:

1. In a self-closing faucet in combination, a hollow handle, a valve stem having a kerfed end projecting into said handle, a kerfed nut engaging threads on said stem, a cross key engaging kerfs in said stem and nut, a locking projection on the key to prevent longitudinal movement of the key, and means on the handle for preventing dislodgment of the same.

2. In a self-closing faucet in combination, a hollow handle, a valve stem having a kerfed end projecting into said handle, a kerfed nut threaded on said stem, a cross key engaging kerfs in said stem and nut, a locking projection on the key to prevent longitudinal movement of the key, and means integral with the handle adapted to prevent dislodgment of the key.

3. In a self-closing faucet in combination, a hollow handle, a valve stem having a kerfed end projecting into said handle, a kerfed nut threaded on said stem, a cross key engaging kerfs in said stem and nut, a locking projection on the key to prevent longitudinal movement of the key, and a projection interiorly of the upper cap and integral therewith, adapted to prevent dislodgment of the key.

4. In a self-closing faucet, in combination, a hollow handle, a valve stem having a kerfed end projecting into said handle, a kerfed nut threaded on said stem, a cross key engaging kerfs in said stem and nut, a locking projection on the key to prevent longitudinal movement of the key, means on the handle to prevent dislodgment of the key, and means on the cross key through which it may be readily removed from said kerfs.

5. In a self-closing faucet in combination, a hollow handle, a valve stem having a kerfed end projecting into said handle, a kerfed nut threaded on said stem, a cross key engaging the kerfs in said stem and nut, a locking projection on the key to prevent longitudinal movement of the key, means on the handle to prevent dislodgment of the key, and notches on the outer edge of said key above said locking nut for removing the key.

6. In a self-closing faucet in combination, a hollow handle, a valve stem having a kerfed end projecting into said handle, a slotted nut engaging threads on said stem, a cross key engaging the kerfs in said stem and nut, a locking projection on the key to prevent longitudinal movement of the key, means on the handle to prevent dislodgment of the key, and a perforation in said cross key above the plane of the nut to permit the removing the key from said kerfs.

In testimony whereof, I have hereunto subscribed my signature, this 3rd day of February, A. D. 1909.

HENRY MUELLER.

Witnesses:
JOHN L. WADDELL,
VIRGINIA HAMILTON.